US008220590B2

(12) United States Patent
Chen et al.

(10) Patent No.: US 8,220,590 B2
(45) Date of Patent: Jul. 17, 2012

(54) THERMOELECTRIC THERMAL MANAGEMENT SYSTEM FOR THE ENERGY STORAGE SYSTEM IN A REGENERATIVE ELEVATOR

(75) Inventors: Lei Chen, South Windsor, CT (US); Jean Yamanis, South Glastonbury, CT (US)

(73) Assignee: Otis Elevator Company, Farmington, CT (US)

( * ) Notice: Subject to any disclaimer, the term of this patent is extended or adjusted under 35 U.S.C. 154(b) by 455 days.

(21) Appl. No.: 12/523,041

(22) PCT Filed: Jan. 11, 2007

(86) PCT No.: PCT/US2007/000743
§ 371 (c)(1),
(2), (4) Date: Jul. 13, 2009

(87) PCT Pub. No.: WO2008/085171
PCT Pub. Date: Jul. 17, 2008

(65) Prior Publication Data
US 2010/0065380 A1    Mar. 18, 2010

(51) Int. Cl.
*B66B 1/06* (2006.01)
(52) U.S. Cl. .......................... 187/290; 187/393
(58) Field of Classification Search .................. 187/247, 187/289, 290, 293, 296, 297, 391–393
See application file for complete search history.

(56) References Cited

U.S. PATENT DOCUMENTS

| | | | | |
|---|---|---|---|---|
| 4,453,114 A * | 6/1984 | Nordlund | | 318/376 |
| 6,055,814 A | 5/2000 | Song | | |
| 6,412,604 B1 * | 7/2002 | Schuster | | 187/290 |
| 6,415,892 B2 * | 7/2002 | Araki et al. | | 187/290 |
| 6,425,461 B1 * | 7/2002 | Wang | | 187/290 |
| 6,454,053 B2 | 9/2002 | Tominaga et al. | | |
| 6,827,182 B2 | 12/2004 | Araki | | |
| 7,896,137 B2 * | 3/2011 | Ishikawa | | 187/290 |
| 2001/0017240 A1 * | 8/2001 | Araki et al. | | 187/290 |
| 2002/0053490 A1 * | 5/2002 | Banno et al. | | 187/290 |
| 2009/0301819 A1 * | 12/2009 | Agirman et al. | | 187/290 |
| 2010/0187045 A1 * | 7/2010 | Ishikawa | | 187/290 |
| 2010/0243381 A1 * | 9/2010 | Hoshino et al. | | 187/391 |
| 2011/0226559 A1 * | 9/2011 | Chen et al. | | 187/290 |

FOREIGN PATENT DOCUMENTS

| | | | |
|---|---|---|---|
| EP | 0759507 | | 2/1997 |
| EP | 1522519 | | 4/2005 |
| JP | 05319719 A | * | 12/1993 |
| JP | 11246137 | | 9/1999 |
| JP | 2001240323 A | | 9/2001 |
| JP | 2006127920 | | 5/2006 |
| KR | 20020055618 | | 7/2002 |
| KR | 20030063595 | | 7/2003 |
| WO | 03033390 A1 | | 4/2003 |
| WO | 2004007332 A1 | | 1/2004 |

OTHER PUBLICATIONS

International Search Report and Written Opinion of the International Searching Authority, Apr. 10, 2007, 12 pages. European Office Action, Jan. 2, 2010, 3 pages.
Japanese Patent Office, Office Action, Mar. 21, 2012, 2 pages.

* cited by examiner

*Primary Examiner* — Anthony Salata
(74) *Attorney, Agent, or Firm* — Kinney & Lange, P.A.

(57) ABSTRACT

A regenerative elevator system operates in three modes: motoring, idle and regeneration. During the regeneration mode, the elevator motor operates as a generator, and electrical energy is stored in an energy storage system for later use. The energy storage system may be located in a machine room or hoistway where temperature can vary widely. A thermoelectric thermal management system provides thermoelectric cooling or heating to maintain the energy storage system within a desired operating temperature range.

23 Claims, 9 Drawing Sheets

THERMOELECTRIC THERMAL MANAGEMENT SYSTEM FOR THE ENERGY STORAGE SYSTEM IN A REGENERATIVE ELEVATOR

REFERENCE TO COPENDING APPLICATIONS

Reference is made to copending applications entitled THERMOELECTRIC THERMAL MANAGEMENT FOR DRIVE CIRCUITRY AND HOIST MOTORS IN AN ELEVATOR SYSTEM, and THERMOELECTRIC TEMPERATURE CONTROL WITH CONVECTIVE AIR FLOW FOR COOLING ELEVATOR COMPONENTS, both of which are filed on even date with this application and are incorporated by reference.

BACKGROUND OF THE INVENTION

This invention relates to elevators which store electrical energy in an energy storage system during a regenerative mode of operation. In particular, the present invention relates to a thermal management system using thermoelectric heating and cooling to maintain the energy storage system in a desired operating temperature range.

Regenerative elevator systems include a regenerative mode of operation which generates power during certain times of elevator operation. During the regenerative operation, the regenerative drive of the elevator produces electricity, which is stored in energy storage devices through a charging circuit. The energy storage devices are typically batteries, although other devices such as super capacitors may also be used as part of an energy storage system.

The batteries used in the energy storage system of a regenerative elevator tend to be expensive components. Achieving satisfactory battery lifetime, therefore, is an important consideration. The lifetime of a chemical energy storage device such as a battery typically decreases exponentially with rising temperature.

A battery generates heat due to ohmic resistance of the battery and the exothermic effect arising from the combination reaction of the substances generated at the anode and cathode during over-charging processes. Elevated temperature accelerates deterioration of the battery. In particular, local heating of some of the cells in series in the battery can cause dramatic reduction of system reliability since unbalanced deterioration of a single cell can lead to propagation of failure in a chain reaction fashion.

When an elevator is in its regenerative mode, the energy generated is used to charge the batteries of the energy storage system. The temperature of the storage system rises during charging. With higher charging rates, which are typical for the regeneration mode, the temperature rise can be pronounced.

Too low an operating temperature also adversely affects the energy storage system. A low ambient temperature reduces the specific power of the battery and thus reduces the amount of stored energy that can be extracted from the battery. Thus lower operating temperatures can reduce the operability of the elevator system and affect the ride quality of the elevator.

The energy storage system for regenerative elevators may be located in the machine room or in the hoistway, where the temperature can vary widely because those locations are not air-conditioned. A new approach to temperature control for the elevator energy storage system is needed.

BRIEF SUMMARY OF THE INVENTION

A regenerative elevator system includes a drive system for driving an elevator during a motoring mode and for producing electrical energy during a regenerative mode. An electrical energy storage system including one or more energy storage devices stores electrical energy produced by the drive system during the regenerative mode. A thermoelectric temperature management system controls ambient conditions of the storage system.

The thermoelectric temperature management system may produce either cooling or heating to maintain the energy storage devices within a desired temperature range. The thermoelectric system may be disposed in an air duct for pre-cooling or pre-heating an air stream used to control the temperature of the storage devices, or may be in direct surface contact with the energy storage devices.

Excess energy produced during the regenerative mode may be used, at least in part, to power the thermoelectric temperature management system. Temperature control may be as a function of one or more sensed parameters, such as state of charge of the electric storage devices, temperature of the devices, and ambient temperature.

DETAILED DESCRIPTION

Figure 1:
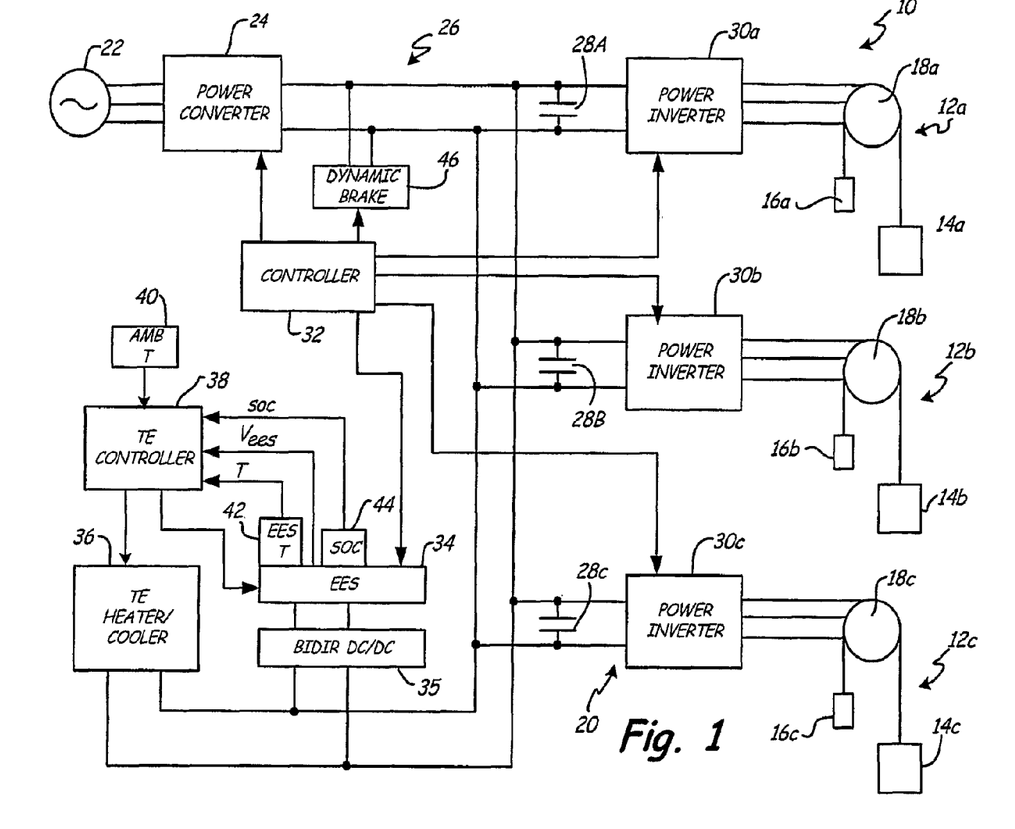
FIG. 1 is a block diagram showing a regenerative elevator system including a thermoelectric thermal management system for maintaining electrical energy storage devices within a desired temperature range.

FIG. 1 shows regenerative elevator system 10, which includes elevators 12a, 12b, and 12c. Each elevator 12a-12c includes elevator cab 14a-14c, counterweights 16a-16c, and hoist motors 18a-18c, respectively. Electrical power to operate elevators 12a-12c is provided by power system 20. While three elevators 12a-12c are shown in FIG. 1, regenerative elevator system 10 can include any number of elevators, including only one.

Power system 20 includes three-phase AC power supply 22, power converter 24, DC bus 26, smoothing capacitors 28a, 28b, and 28c, power inverters 30a, 30b, and 30c, controller 32, electrical energy storage (EES) system 34, thermoelectric (TE) heater/cooler 36, thermoelectric (TE) temperature management controller 38, ambient temperature sensor 40, EES temperature sensor 42, state of charge monitor 44, and dynamic brake 46.

Three-phase AC power supply 20, which may be a commercial power source, provides electrical power to power converter 24. Power converter 24 is a three-phase power inverter that is operable to convert three-phase AC power from power supply 22 to DC power. In one embodiment, power converter 24 includes a plurality of power transistor circuits. Controller 32 controls the power transistor circuits to rectify the three-phase AC power from power supply 22 to DC power output that is supplied onto DC bus 26. While power supply 22 is shown as a three-phase power supply, power system 20 may be adapted to receive power from any type of power source, including a single phase AC power source and a DC power source.

Controller 32 monitors voltage across DC bus 26 with a voltage sensor or an overvoltage detection circuit, to assure the voltage across bus 26 does not exceed a threshold voltage level. This threshold level, which may be programmed into controller 32, is set to prevent overloading of components on power system 10. If the voltage across DC bus 26 exceeds the threshold level, controller 32 activates dynamic brake 46 to allow current flow through a dynamic brake resistor or resistors. This causes excess energy on DC bus 26 to be dissipated as heat.

Power inverters 30a-30c are three-phase power inverters that are operable to invert DC power from DC bus 26 to three-phase AC power. Power inverters 30a-30c may comprise a plurality of power transistor circuits that are controlled by controller 32. The three-phase AC power at the outputs of power inverters 30a-30c is provided to hoist motors 18a-18c of elevators 12a-12c, respectively.

The power transistor circuits of power inverters 30a-30c are also operable to rectify power that is generated when elevators 12a-12c drive their respective hoist motors 18a-18c. For example, if hoist motor 18a of elevator 12a is generating power, controller 32 controls the transistor circuits of power inverter 30a to allow the generated power to be rectified and provided to DC bus 26. Smoothing capacitors 28a-28c smooth the rectified power provided by power inverters 30a-30c on DC bus 26.

Hoist motors 18a-18c control the speed and direction of movement between respective elevator cabs 14a-14c and counterweights 16a-16c. The power required to drive each hoist motor 18a-18c varies with the acceleration and direction of elevators 12a-12c respectively, as well as the load in elevators 12a-12c, respectively. For example, if elevator 12a is being accelerated, run up with a load greater than the weight of counterweight 16a, or run down with a load less than the weight of counterweight 16a, a maximal amount of power is required to drive hoist motor 18a. If elevator 12a is leveling or running at a fixed speed with a balanced load, it may be using a lesser amount of power. If elevator 12a is being decelerated, running down with a heavy load, or running up with a light load, elevator 12a drives hoist motor 18a. In this case, hoist motor 18a generates three-phase AC power that is converted to DC power by power inverter 30a under the control of controller 32. The converted DC power is accumulated on DC bus 26.

Power system 20 also includes electrical energy storage (EES) system 34, which is connected to DC bus 26 through bi-directional DC/DC converter 35. EES 34 includes battery storage modules, and may also include capacitive storage modules, together with switching circuitry to control charging and discharging of the storage modules.

EES 34 stores excess power output from power converter 24 and from power inverters 30a-30c during periods of negative power demand by hoist motors 18a-18c (i.e. regenerative mode). The energy stored in EES 34 may be used to power hoist motors 18a-18c during periods of positive power demand (i.e. motoring mode). The use of capacitive storage modules in parallel with battery storage modules within EES 34 can provide a current boost during periods of peak power demand by hoist motors 18a-18c.

Controller 32 provides control signals to EES 34 to manage the power stored in EES 34. During periods of positive power demand, controller 32 allows power stored in EES 34 to be available on DC bus 26. During periods of negative power demand, controller 32 allows excess power on DC bus 26 to be stored in EES 34.

By incorporating EES 34 into power system 20, several advantages are realized. Storing excess energy generated during periods of negative power demand on hoist motors 18a-18c avoids the loss of energy associated with converting the power on DC bus 26 to three-phase AC power through power converter 24. The demand on power supply 22 is reduced by the storage capacity of EES 34. In the event of a power failure or malfunction of power supply 22, energy stored in EES 34 may be used to power hoist motors 18a-18c for rescue and limited emergency, which will be referred to as extended service operation of elevators 12a-12c.

The ambient conditions for an elevator within system 10 may range, for example, from about 0° C. to about 45° C., with humidity up to 95%. EES 34 may be located in the machine room or the hoistway of elevator system 10, where the temperature may vary even more because those locations are not air-conditioned.

The batteries within EES 34 generate heat due to ohmic resistance and by exothermic effects during overcharging. Elevated temperatures can accelerate the deterioration of batteries within EES 34. Local temperature control of EES 34 is provided by a thermoelectric (TE) temperature management system that includes TE heater/cooler 36, TE controller 38, ambient temperature sensor 40, EES temperature sensor 42, and state of charge monitor 44. As will be illustrated by FIGS. 2A-2B and 3A-3B, TE heater/cooler 36 may include thermoelectric elements directly in contact with the storage modules of the EES 34, or may indirectly heat or cool the EES modules by heating or cooling air that is directed onto the EES modules. TE heater/cooler 36 can also include heat pipes, heat sinks, and other heat exchangers in conjunction with the thermoelectric elements to cool or heat the EES modules. In another embodiment, the thermoelectric elements are used in conjunction with cool air and warm air ducts as described in the copending application entitled THERMOELECTRIC TEMPERATURE CONTROL WITH CONVECTIVE AIR FLOW FOR COOLING ELEVATOR COMPONENTS.

Control of TE heater/cooler 36 is performed by TE controller 38 as a function of ambient temperature, the local temperature of EES 34, and the state of charge of the storage modules of EES 34. TE heater/cooler 36 is operated by DC power provided by DC bus 26. The direction of current flow through the TE elements of TE heater/cooler 36 determines whether heater/cooler 36 operates in a heating or in a cooling mode. The operating mode is determined by TE controller 38 based upon inputs that include ambient temperature, EES temperature, and state of charge.

The use of TE heater/cooler 36 provides a very small footprint for the thermal management system. TE heater/cooler 36 is capable of extremely fast response, and can provide both heating and cooling with the same device by the simple means of reversing current flow. During a condition when excess DC power is being provided onto bus 26, which can result in an overcharging condition in EES 34, TE heater/cooler 36 can use that excess power to provide cooling. Thus the excess energy is being used, while reducing thermal effects caused by potential overcharging.

TE heater/cooler 36 also can function as a dehumidifier. As a result, moisture that could otherwise condense on the surface of storage device 34 can be reduced, so that heat transfer between EES 34 and the ambient environment is enhanced.

Figure 2A:
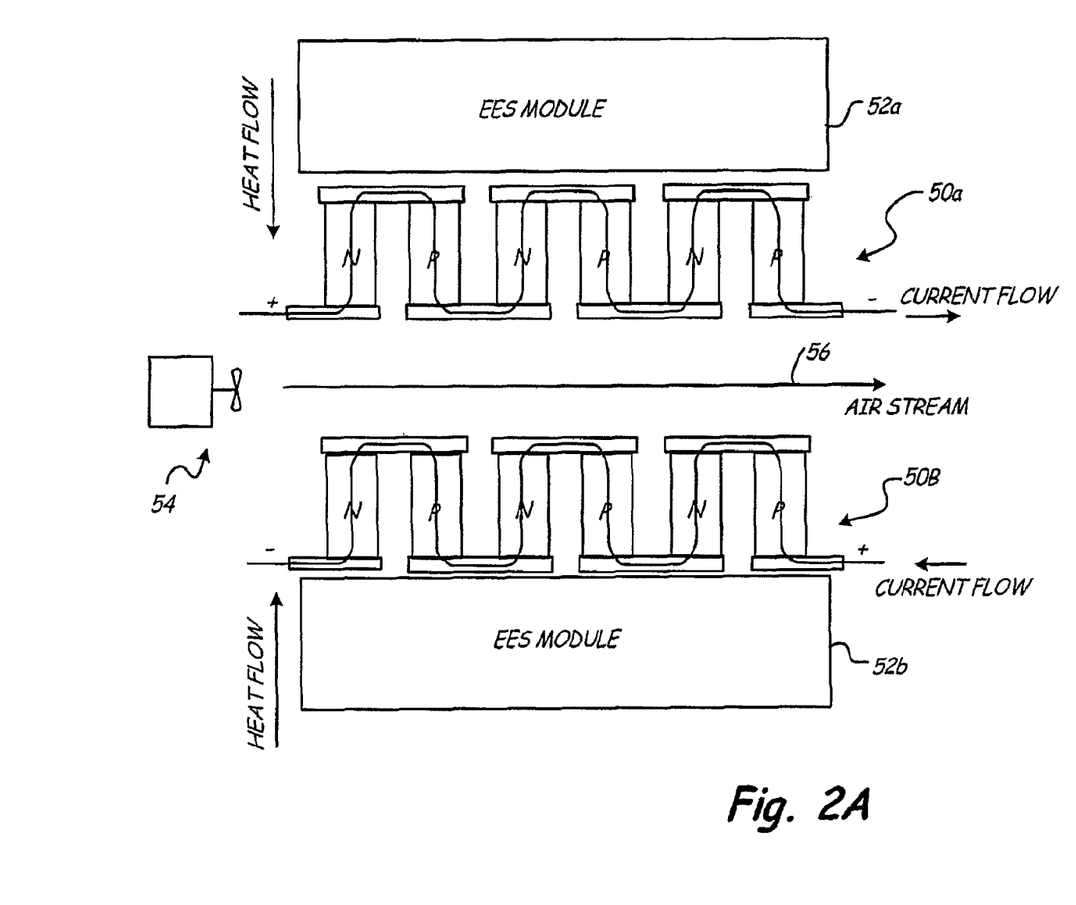
FIGS. 2A and 2B show a thermoelectric thermal management system with thermoelectric devices in direct contact with electrical energy storage modules for cooling and heating, respectively.
Figure 2B:
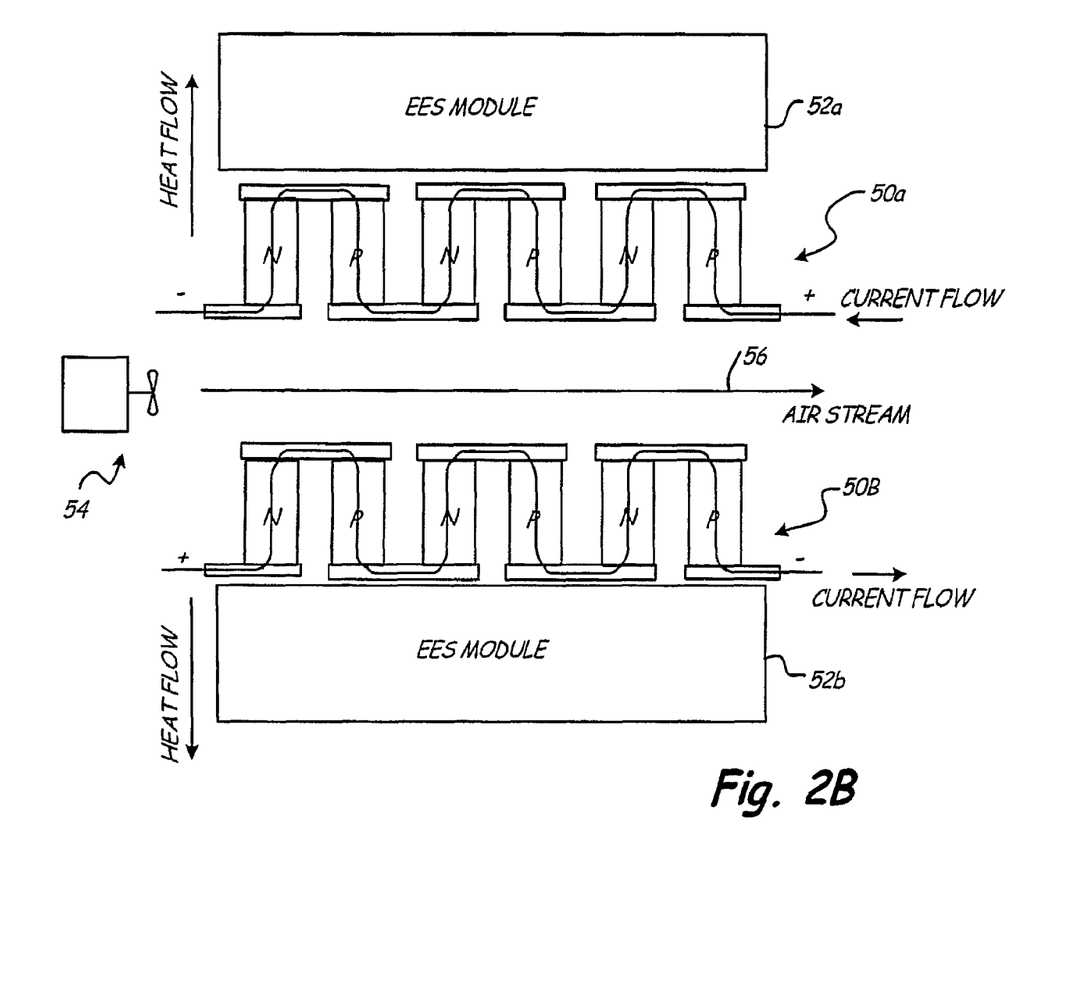

FIGS. 2A and 2B illustrate an embodiment of TE heater/cooler 36 which provides direct cooling or heating to EES battery modules. FIG. 2A shows operation in a cooling mode, while FIG. 2B shows operation in heating mode.

In FIGS. 2A and 2B, a pair of TE devices 50a and 50b are placed in direct contact with EES modules 52a and 52b, respectively. Each TE device 50a and 50b includes a series of alternating N type and P type semiconductor elements. The N type and P type elements are connected so that current will flow in a serpentine path as illustrated in FIGS. 2A and 2B. The direction of current flow will determine whether heat flows from EES modules 52a and 52b toward TE elements 50a and 50b (as shown in FIG. 2A) or heat flows from elements 50a and 50b toward EES modules 52a and 52b (as shown in FIG. 2B). In both cases, air stream 56 is directed between elements 50a and 50b, as shown in FIGS. 2A and 2B. TE heater/cooler 36 also includes fan 54, which provides air stream 56 that flows past thermoelectric elements 50a and 50b.

The heating and cooling produced by TE elements 50a and 50b is based upon the heat flow that occurs within each of the N type and P type semiconductor elements. Movement of free charge carriers cause thermal flow within a semiconductor material. An N type material, the free charge carriers are electrons and heat flows in the same direction as the electron flow. In P type semiconductors, the free charge carriers are holes and heat flows in the same direction as hole flow. By convention, current flows in a direction opposite to electron flow, while current flows in the same direction as hole flow. Therefore, in N type materials heat flows in the same direction as electron flow or in the opposite direction to current flow, and in P type materials heat flows in the same direction as hole and current flow.

In FIG. 2A, current flows in the N type elements toward EES modules 52a and 52b. Current flows in the P type elements in a direction away from the EES modules 52a and 52b. As a result, both electrons in the N type elements and holes in the P type elements flow away from EES modules 52a and 52b. A thermal gradient is produced in a direction away from EES modules 52a and 52b and toward air stream 56 thus causing heat to flow out of the EES modules as described above leading to cooler EES modules mitigating the negative effects of high ambient temperature on the charge capacity, life and performance of the EES modules. As will be described below, the temperature of the EES modules can thereby be controlled to a desirable value or range of values as dictated by product requirements.

In FIG. 2B, which illustrates heating of EES modules 52a and 52b, the direction of current flow is reversed from that shown in FIG. 2A. Current flows in P type elements toward EES modules 52a and 52b and flows toward EES modules 52a and 52b in N type elements. As a result, a thermal gradient is produced in a direction toward EES modules 52a and 52b and away from air stream 56 thus causing heat to flow into the EES modules as described above leading to cooler EES modules mitigating the negative effects of low ambient temperatures on the charge capacity, life and performance of the EES modules. As will be described below, the temperature of the EES modules can thereby be controlled to a desirable value or range of values as dictated by product requirements.

Figure 3A:
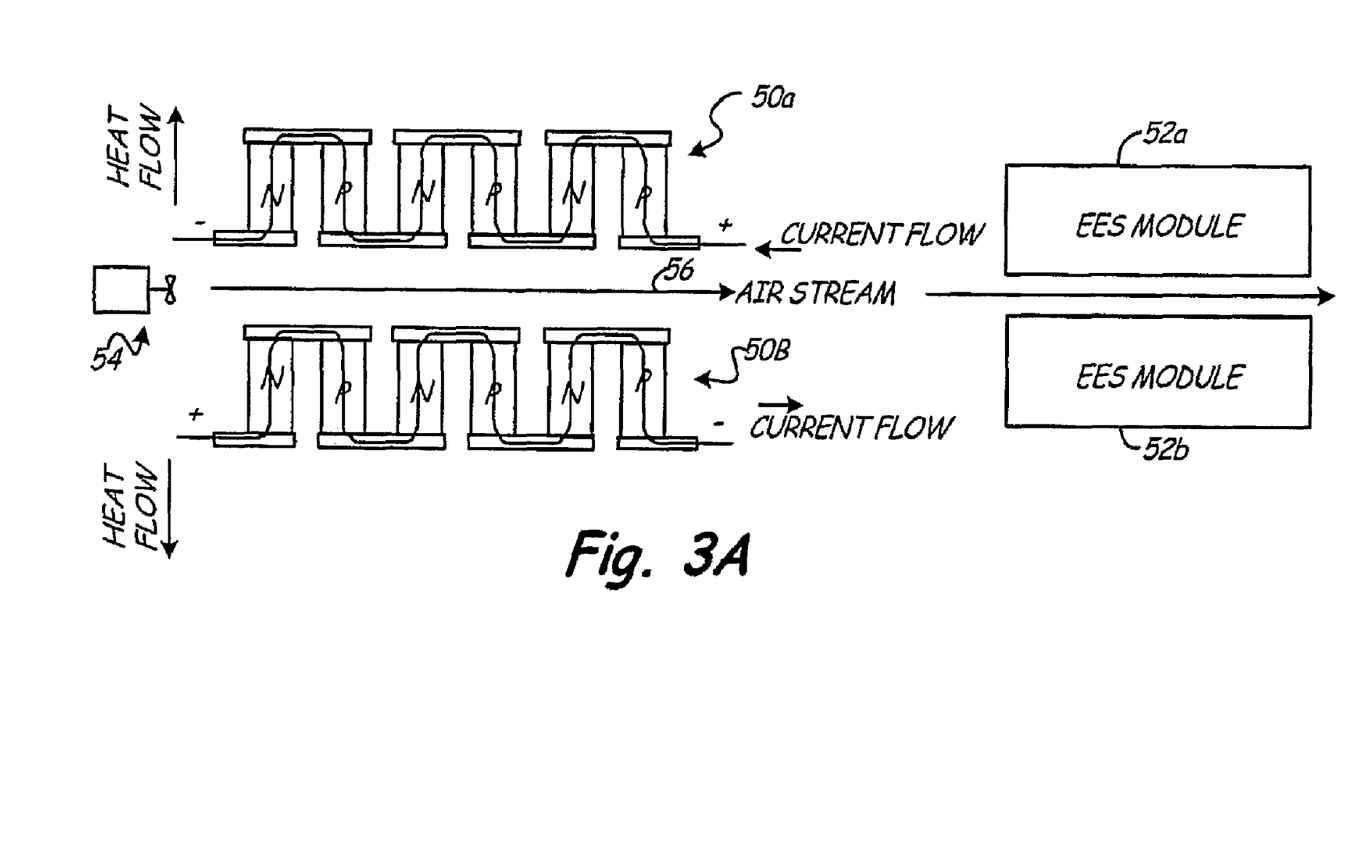
FIGS. 3A and 3B show a thermoelectric thermal management system in which thermoelectric devices cool or heat an air stream, respectively, to control temperature of electrical energy storage modules.
Figure 3B:
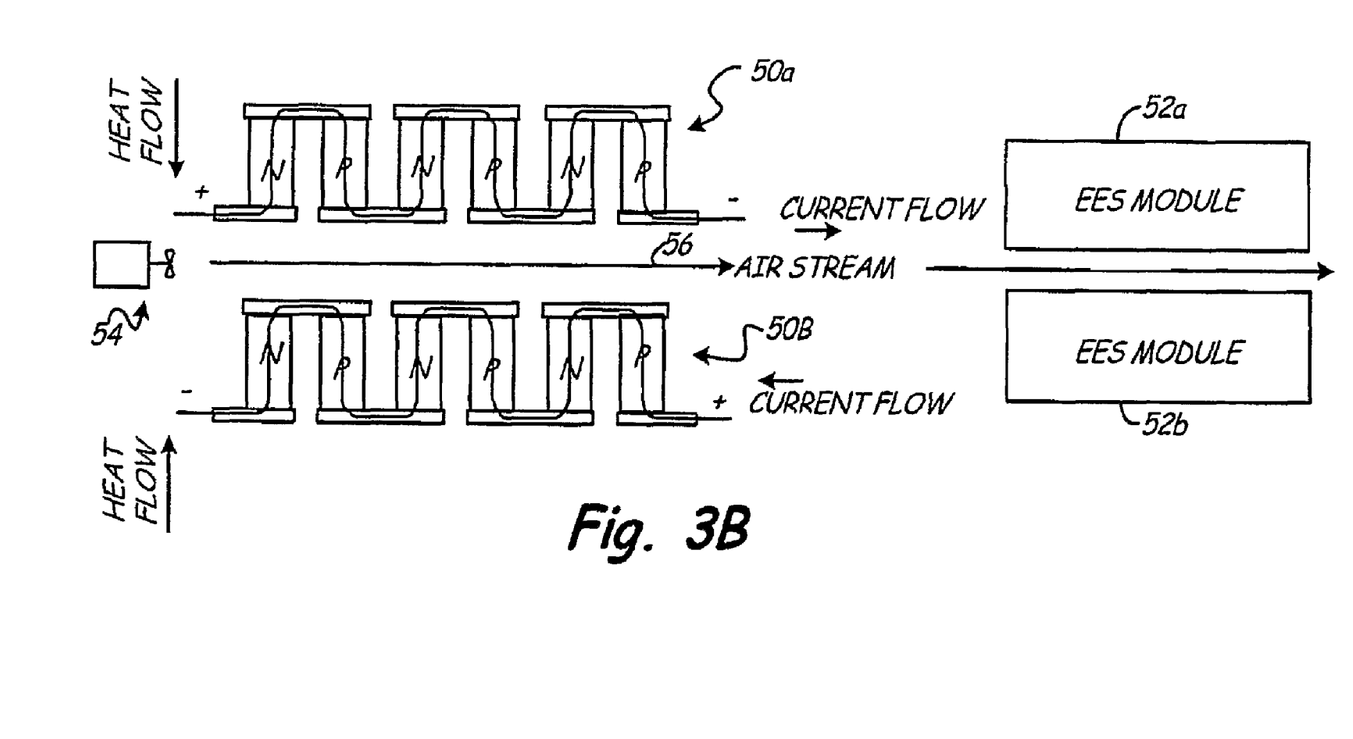

FIGS. 3A and 3B show another embodiment of TE heater/cooler 36 in which TE elements 50a and 50b are positioned in air stream 56 produced by fan 54. Air stream 56, after heating or cooling by TE elements 50a and 50b, flows past EES modules 52a and 52b.

In FIG. 3A, the current flow in elements 50a and 50b causes electrons in the N type elements and holes in the P type elements to move away from air stream 56 that is passing between elements 50a and 50b. As a result, thermal gradients and heat flow are produced in a direction away from air stream 56, so that air stream 56 is cooled by elements 50a and 50b. As cooled air stream 56 flows past EES modules 52a and 52b, heat is transferred from modules 52a and 52b to air stream 56, thereby cooling the modules and reducing the negative effects of high ambient temperature on the charge capacity, life and performance of the EES modules.

In FIG. 3B, the direction of current flow in elements 50a and 50b is reversed from the direction shown in FIG. 3A. Holes in P type elements and electrons in N type elements move toward air stream 56. As a result, a thermal gradient is produced and heat flows from elements 50a and 50b to air stream 56. As air stream 56 then passed EES modules 52a and 52b, it transfers heat, thereby causing the temperature of EES modules 52a and 52b to be increased from a low ambient temperature and improve their performance.

Figure 4A:
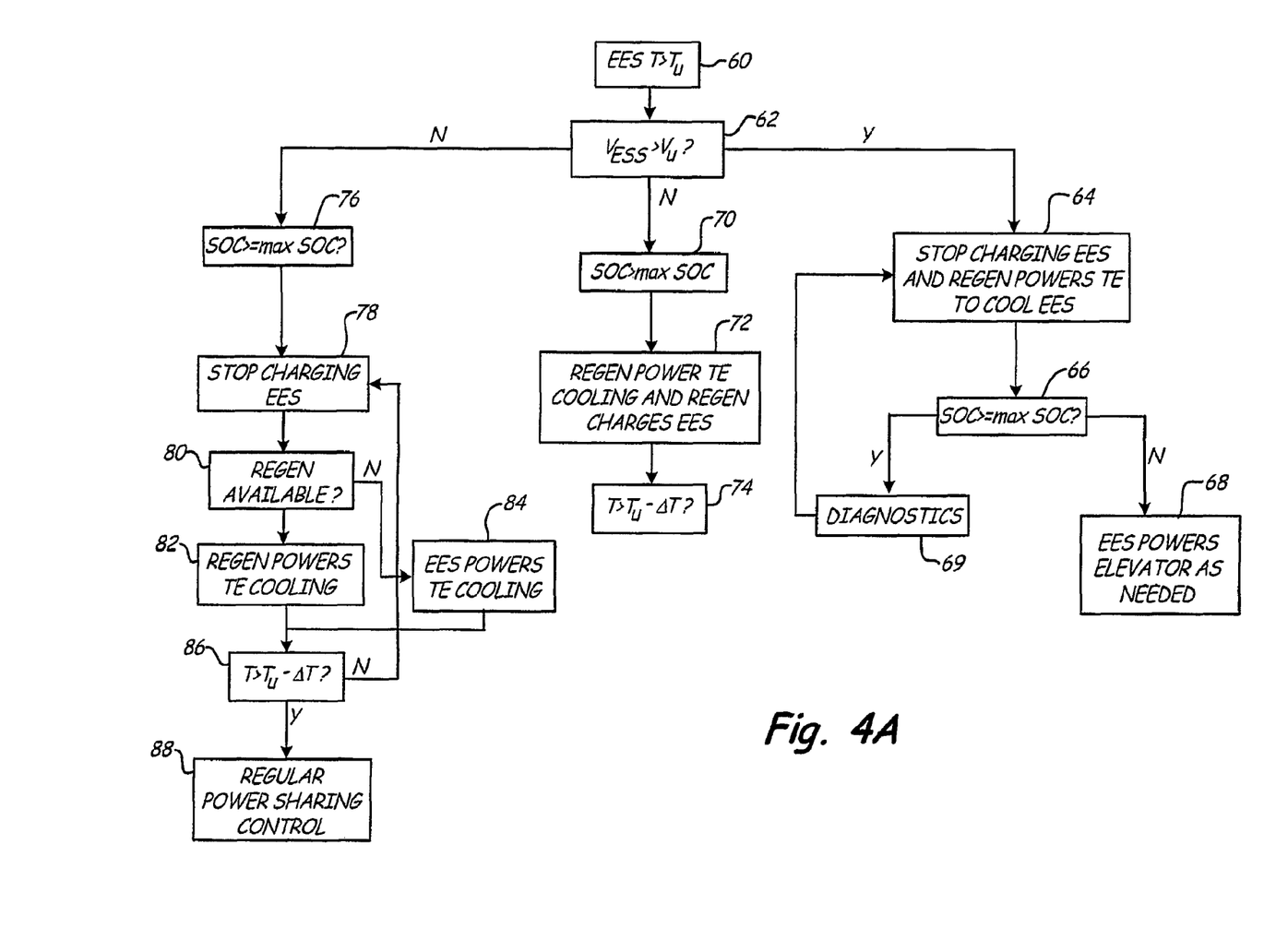
FIG. 4A is a flow diagram showing operation of a thermoelectric thermal management system operated in a cooling mode for a single elevator.
Figure 4B:
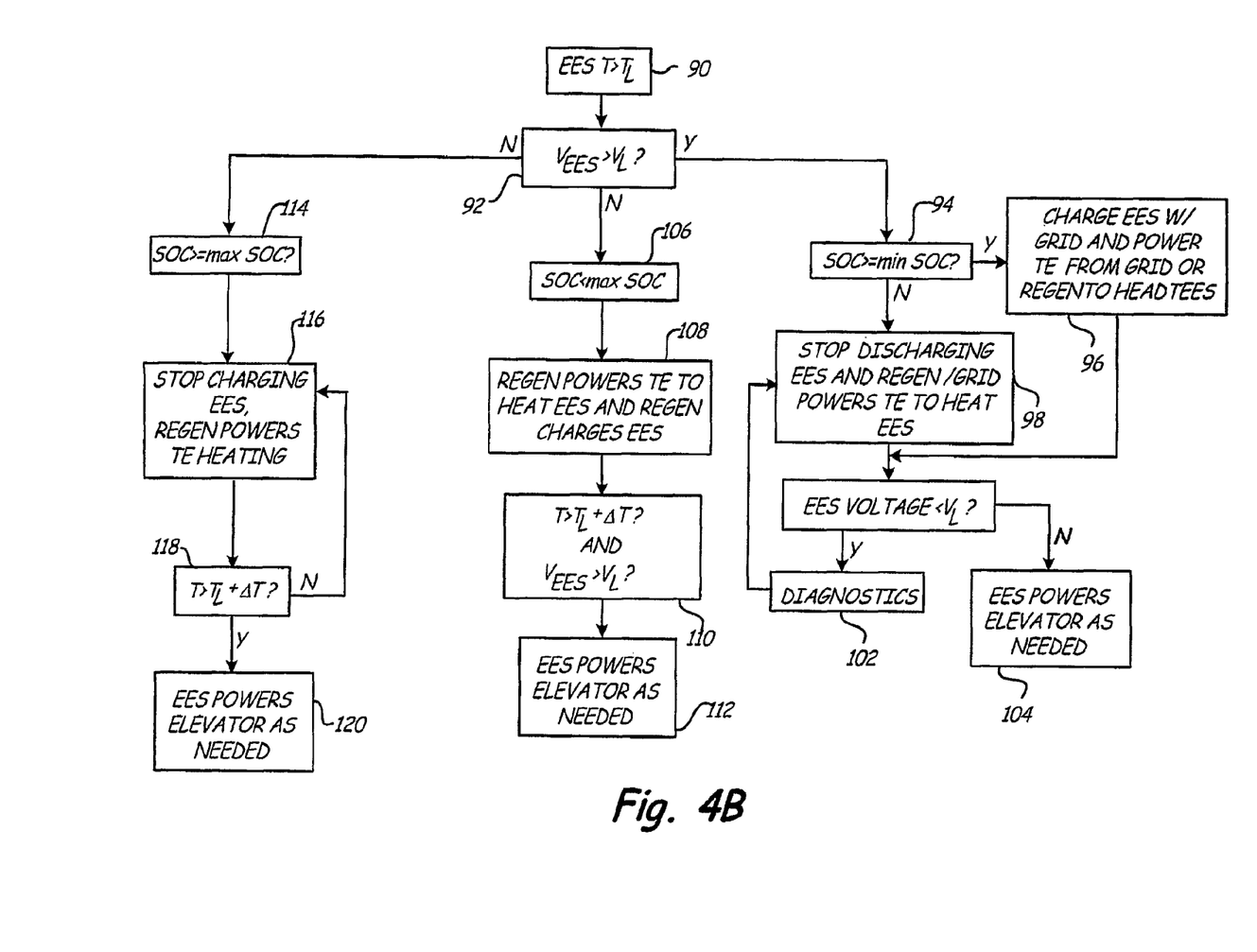
FIG. 4B shows a flow diagram of a thermoelectric thermal management system operated in a heating mode for a single elevator.
Figure 5A:
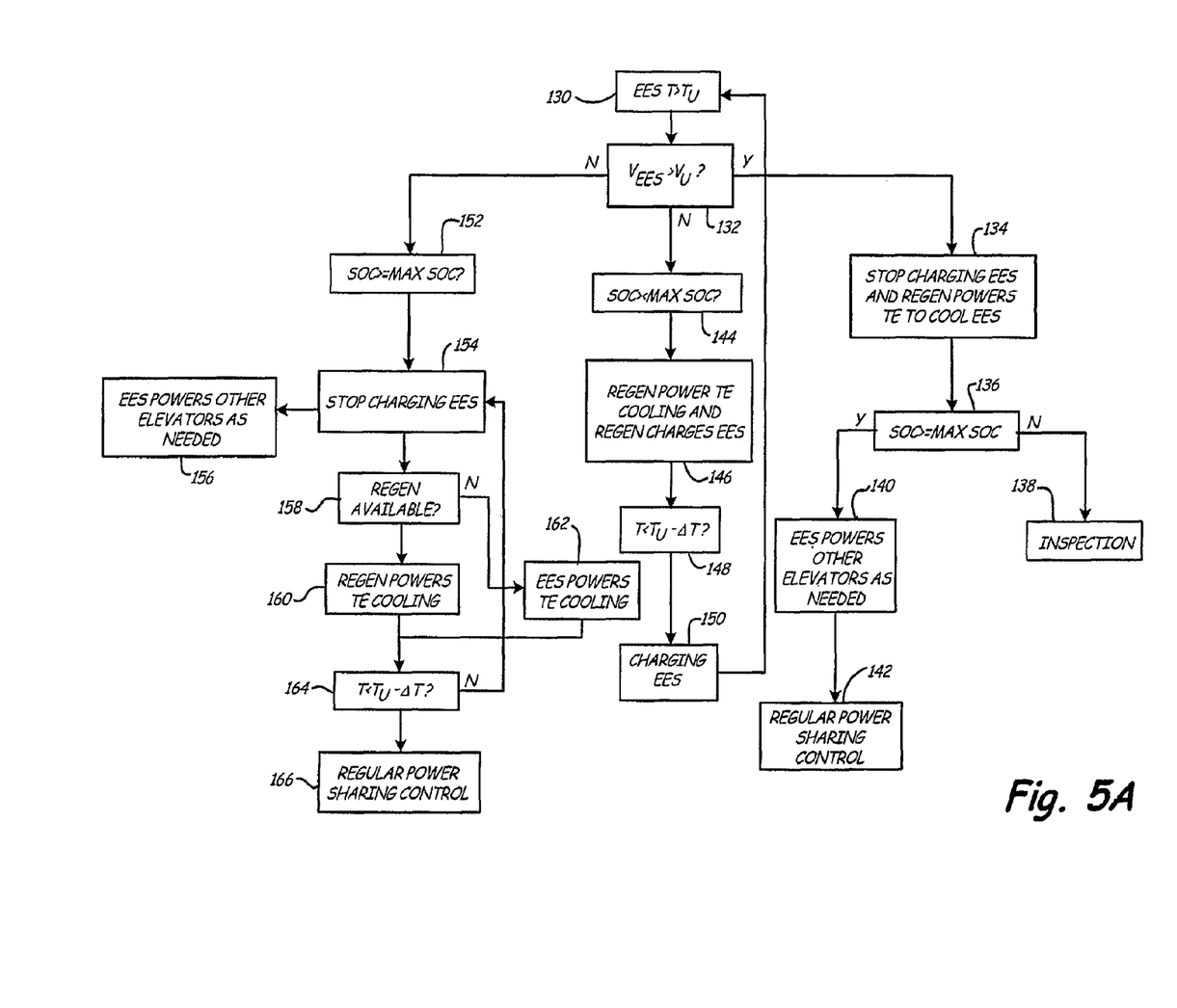
FIG. 5A shows a thermoelectric thermal management system operating in a cooling mode for a regenerative elevator system having a group of elevators with at least one elevator in a regenerative mode and at least one elevator in a motoring mode.
Figure 5B:
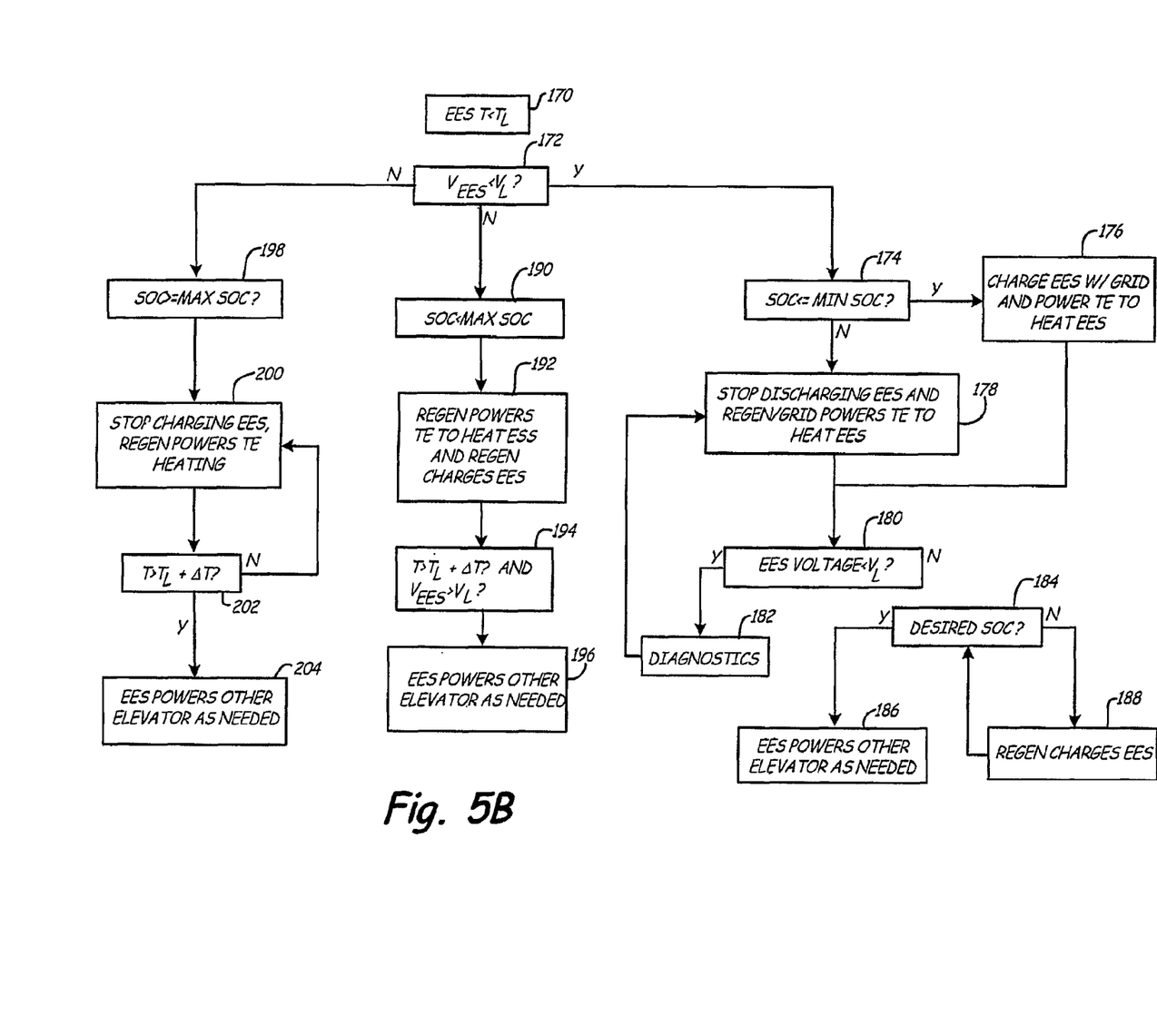
FIG. 5B is a flow diagram of the thermoelectric thermal management system operating in a heating mode for a regenerative elevator system having a group of elevators with at least one elevator in a regenerative mode and at least one elevator in a motoring mode.

FIGS. 4A, 4B, 5A and 5B are flow charts illustrating operation of the TE thermal management system. FIGS. 4A and 4B show an example of cooling and heating modes, respectively, in a system with a single elevator operating. FIGS. 5A and 5B show an example of cooling and heating modes, respectively, in a system with a group of elevators having at least one elevator in regenerative mode and at least one elevator in motoring mode.

FIG. 4A shows operation of TE heater/cooler 36 in a cooling mode. In the example shown in FIG. 4A, the hybrid elevator system has only a single elevator in operation.

In FIG. 4A, $T_L$ represents the lower temperature limit for EES 34. $T_U$ represents the upper temperature limit for EES 34. $\Delta T$ represents an allowable positive or negative variation from the lower temperature limit $T_L$ or the upper temperature limit $T_U$. $V_U$ is the allowable upper EES voltage. SOC stands for state of charge and represents available charge capacity of EES 34.

The cooling mode illustrated in FIG. 4A begins when TE controller 38 determines that the EES temperature is greater than upper temperature limit $T_U$ (step 60). TE controller 38 then compares the EES voltage $V_{EES}$ to allowable upper voltage $V_U$ (step 62).

If the $V_{EES}$ voltage exceeds $V_U$, TE controller 38 provides control signals to EES 34 and to TE heater/cooler 36 to stop the charging of EES 34 from DC bus 26, and to allow regenerative power being supplied to DC bus 26 to power TE heater/cooler 36 in a cooling mode to cool EES 34 (step 64).

TE controller 38 then checks state of charge SOC to determine whether it is equal to or exceeds the maximum allowable state of charge (step 66). If SOC is below the maximum value, TE controller 38 allows EES 34 to power the elevator as needed (step 68).

If the state of charge is greater than or equal to the maximum, TE controller 38 performs diagnostics (step 69) and then returns to step 64.

If TE controller 38 has determined that $V_{EES}$ is not greater than the allowable upper voltage $V_U$ (step 62), then TE controller 38 compares the state of charge to the maximum state of charge value. If the state of charge is less than the maximum (step 70), then TE controller 38 provides control signals to EES 34 and TE heater/cooler 36 to cause regenerative power supplied to DC bus 26 to power TE heater/cooler 36 in a cooling mode and to charge EES 34 (step 72). This will continue until, the temperature of EES 34, as indicated by EES temperature sensor 42, is less than $T_U-\Delta T$ (step 74). At that point, TE heater/cooler 36 and TE controller 38 will exit the cooling mode.

If $V_{EES}$ is greater than $V_U$ (step 62) and the state of charge SOC is equal to or greater than the maximum state of charge allowed (step 76), then TE controller 38 provides a control signal to EES 34 to stop charging of EES 34 (step 78).

TE controller 38 then checks to determine whether regenerative power is available (step 80). If regenerative power is available, TE controller 38 causes TE heater/cooler 36 to operate in a cooling mode using regenerative power (step 82). If regenerative power is not available, TE controller 38 causes EES 34 to provide power over bus 26 to operate TE heater/cooler 36 in a cooling mode (step 84).

TE controller 38 checks whether the EES temperature T is less than $T_U-\Delta T$ (step 86). If the answer is no, then TE controller 38 returns to step 78, and charging of EES 34 continues to be inhibited. If the answer is yes, then cooling is no longer necessary and the system returns to regular power sharing on DC bus 26, without operation of TE heater/cooler 36 (step 88).

FIG. 4B illustrates the control of TE heater/cooler 36 in a heating mode with a single elevator operating. The heating mode begins when TE controller 38 determines that the EES temperature T is less than lower limit temperature $T_L$ (step 90). TE controller 38 then compares the EES voltage $V_{EES}$ to the lower voltage limit $V_L$ (step 92).

If $V_{EES}$ is less than $V_L$, TE controller 38 determines whether the state of charge SOC is less than or equal to the minimum state of charge value (step 94). If the answer is yes, then TE controller 38 causes EES 34 to be charged with grid power (i.e. power from power source 22). In addition, TE heater/cooler 36 is operated in a heating mode with either grid power or regenerative power (step 96).

If the state of charge is greater than the minimum state of charge value, then TE controller 38 stops the discharging of EES 34 and uses either regenerative or grid power to operate TE heater/cooler 36 in a heating mode in order to heat EES 34 (step 98).

TE controller 38 then compares $V_{EES}$ to the lower limit voltage $V_L$ (step 100). If the $V_{EES}$ is less than $V_L$, diagnostics are performed (step 102) and TE controller 38 returns to step 98. As a result, EES 34 is not allowed to discharge until $V_{EES}$ equals or exceeds $V_L$. At that point, TE controller 38 allows EES 34 to provide power to the elevator as needed (step 104).

If TE controller 38 has determined at step 92 that $V_{EES}$ is less than $V_L$, it next checks the state of charge. If the state of charge SOC is less than the maximum state of charge value (step 106), TE controller 38 causes TE heater/cooler to operate in a heating mode using regenerative power. In addition, it causes regenerative power to be used to charge EES 34 (step 108).

TE controller 38 continues to monitor both the temperature T and the voltage $V_{EES}$ of EES 34. When the temperature T exceeds $T_L+\Delta T$ and voltage $V_{EES}$ exceeds $V_L$ (step 110), TE controller 38 allows EES 34 to power the elevator as needed (step 112).

If $V_{EES}$ is equal to or greater than $V_L$ and the state of charge is greater than the maximum value (step 114), TE controller 38 stops the charging of EES 34, and causes TE heater/cooler 36 to operate in a heating mode using regenerative power (step 116).

TE controller 38 monitors the temperature to determine whether the temperature exceeds $T_L+\Delta T$ (step 118). As long as the temperature does not exceed $T_L+\Delta T$, charging of EES 34 is stopped, and heating using regenerative power to operate TE heater/cooler 36 continues (step 116). When the temperature exceeds $T_L+\Delta T$, TE controller 38 allows EES 34 to power the elevator as needed (step 120).

FIG. 5A shows operation of TE heater/cooler 36 in a cooling mode when a group of elevators are operated, with at least one elevator in a regenerative mode and at least one elevator in a motoring mode. Cooling mode begins when TE controller 38 determines that the EES temperature T is greater than the upper temperature limit $T_U$ (step 130). TE controller 38 then compares EES voltage $V_{EES}$ to allowable upper voltage $V_U$ (step 132).

If $V_{EES}$ exceeds $V_U$, TE controller 38 provides control signals to EES 34 and to TE heater/cooler 36. Charging of EES 34 from DC bus 26 is stopped, and regenerative power being supplied to DC bus 26 is used to power TE heater/cooler 36 to cool EES 34 (step 134).

TE controller 38 then checks the state of charge SOC of EES 34 to determine whether SOC is equal to or exceeds the maximum allowable state of charge (step 136). If SOC is below the maximum value, inspection is required (step 138).

If SOC is equal to or greater than the maximum allowable state of charge, TE controller 38 controls EES 34 to power other elevators in the system as needed (step 140). Regular power sharing control between TE heater/cooler 36 and the elevators continues until EES temperature T no longer exceeds upper temperature limit $T_U$ (step 142).

If TE controller 38 has determined that $V_{EES}$ is not greater than the allowable upper voltage $V_U$ (step 132), then TE controller 38 compares state of charge SOC to the maximum state of charge value. If the state of charge value is less than the maximum (step 144), then TE controller 38 provides control signals to both EES 34 and TE heater/cooler 36 to cause regenerative power supplied to DC bus 26 to power TE heater/cooler 36 in a cooling mode and to charge EES 34 (step 146). This will continue until temperature T of EES 34 is less than $T_U-\Delta T$ (step 148). At that point, TE controller 38 will continue to charge EES 34 using regenerative power, but will discontinue operation of TE heater/cooler 36 (step 150).

If $V_{EES}$ is greater than $V_U$ (step 132) and state of charge SOC is equal to or greater than the maximum state of charge allowed (step 152), then TE controller 38 provides a control signal to EES 34 to stop charging (step 154). EES 34 then is used to power other elevators as needed (step 156).

If regenerative power is available (step 158), TE controller 38 causes TE heater/cooler 36 to operate in a cooling mode using regenerative power (step 160). If regenerative power is not available, TE controller 38 causes EES 34 to provide power to operate TE heater/cooler 36 in a cooling mode (step 162).

TE controller 38 checks whether EES temperature T is less than $T_U-\Delta T$ (step 164). If the answer is no, then TE controller 38 returns to step 154. If the answer is yes, then cooling is no longer necessary, and the system returns to regular power sharing on DC bus 26, without operation of TE heater/cooler 36 (step 166).

FIG. 5B illustrates operation of TE controller 38 and TE heater/cooler 36 in a heating mode while multiple elevators are operating. The heating mode begins when TE controller 38 determines that EES temperature T is less than lower limit temperature $T_L$ (step 170).

FIG. 5B illustrates the control of TE heater/cooler 36 in a heating mode with multiple elevators operating, so that at least one elevator is in the regenerative mode and another is in the motoring mode. The heating mode begins when TE controller 38 determines that the EES temperature T is less than lower limit temperature $T_L$ (step 170). TE controller 38 then compares the EES voltage $V_{EES}$ to the lower voltage limit $V_L$ (step 172).

If $V_{EES}$ is less than $V_L$, TE controller 38 determines whether the state of charge SOC is less than or equal to the minimum state of charge value (step 174). If the answer is yes, then TE controller 38 causes EES 34 to be charged with grid power (i.e. power from power source 22). In addition, TE heater/cooler 36 is operated in a heating mode with either grid power or regenerative power (step 176).

If the state of charge is greater than the minimum state of charge value, then TE controller 38 stops the discharging of EES 34 and uses either regenerative or grid power to operate TE heater/cooler 36 in a heating mode in order to heat EES 34 (step 178).

TE controller 38 then compares $V_{EES}$ to the lower limit voltage $V_L$ (step 180). If the $V_{EES}$ is less than $V_L$, diagnostics are performed (step 182) and TE controller 38 returns to step 178. As a result, EES 34 is not allowed to discharge until $V_{EES}$ equals or exceeds $V_L$. At that point, TE controller 38 determines whether EES 34 is at a desired state of charge (greater than the minimum) (step 184). If yes, TE controller 38 allows EES 34 to provide power to the elevator as needed (step 186). If no, TE controller 38 causes EES 34 to be charged from regenerative power (step 188), and continues to monitor the state of charge (step 184).

If TE controller 38 has determined at step 172 that $V_{EES}$ is less than $V_L$, it next checks the state of charge. If the state of charge SOC is less than the maximum state of charge value (step 190), TE controller 38 causes TE heater/cooler to operate in a heating mode using regenerative power. In addition, it causes regenerative power to be used to charge EES 34 (step 192).

TE controller 38 continues to monitor both the temperature T and the voltage $V_{EES}$ of EES 34. When the temperature T exceeds $T_L + \Delta T$ and voltage $V_{EES}$ exceeds $V_L$ (step 194), TE controller 38 allows EES 34 to power the elevators as needed (step 196).

If $V_{EES}$ is equal to or greater than $V_L$ and the state of charge is greater than the maximum value (step 198), TE controller 38 stops the charging of EES 34, and causes TE heater/cooler to operate in a heating mode using regenerative power (step 200).

TE controller 38 monitors the EES temperature T to determine whether temperature T exceeds $T_L + \Delta T$ (step 202). If the answer is no, charging of EES 34 is inhibited and heating using regenerative power to operate TE heater/cooler 36 continues (step 200). When the temperature exceeds $T_L + \Delta T$, TE controller 38 allows EES 34 to power the elevators as needed (step 204).

The TE thermal management system for the energy storage system of a hybrid elevator maintains the energy storage device in a temperature controlled environment to realize a maximum lifetime. Since the lifetime of batteries typically decreases exponentially with rising temperatures, the TE thermal management system provides thermoelectric cooling in high ambient temperature environments or under charge and discharge conditions to control the temperature of the electrical energy storage modules to within a desirable temperature range as dictated by product requirements regarding life, cycle life, electrochemical performance and the like.

In addition, the TE thermal management system provides heating if the ambient temperature is too low. The specific power of the energy storage devices decreases with decreasing temperature. The TE thermal management system provides thermoelectric heating when necessary to maintain the energy storage devices above a minimum temperature in order to provide stable performance of the EES system and extend its lifetime.

By the use of thermoelectric devices to provide local temperature control, the TE thermal management system is capable of providing thermal management of the energy storage devices in locations such as the machine room or the hoistway which are not air conditioned. The benefits of the TE thermal management system include a very small footprint, extremely fast response, the ability to perform multiple functions (heating and cooling) with the same device, the ability to utilize extra power from the grid or the regenerative power from the elevator drive to obtain improved energy efficiency, while extending battery life and maintaining stable high quality operation of the hybrid elevator system.

Although the present invention has been described with reference to preferred embodiments, workers skilled in the art will recognize that changes may be made in form and detail without departing from the spirit and scope of the invention.

The invention claimed is:

1. An elevator system comprising:
    an elevator;
    a drive system for driving the elevator during a motoring mode and producing electrical energy during a regenerative mode;
    an electrical energy storage system for storing electrical energy produced by the drive system during the regenerative mode; and
    a thermoelectric thermal management system for controlling an ambient condition of the electrical energy storage system by selectively heating and cooling to maintain the energy storage system in a desired operating temperature range.

2. The elevator system of claim 1 wherein the thermoelectric thermal management system is selectively powered by electrical energy from the drive system.

3. The elevator system of claim 1 wherein the thermoelectric thermal management system includes a thermoelectric device positioned to condition an air stream directed to the electrical energy storage system.

4. The elevator system of claim 1 wherein the thermoelectric thermal management system includes a thermoelectric device having a working surface in contact with the electrical energy storage system.

5. The elevator of claim 1 wherein the electrical energy storage system is located in a hoistway of the elevator.

6. The elevator system of claim 1 wherein the electrical energy storage system is located in a machine room of the elevator.

7. The elevator system of claim 1 wherein the thermoelectric thermal management system controls a temperature of the electrical energy storage system as a function of at least one sensed parameter.

8. The elevator system of claim 7, wherein the sensed parameter comprises a temperature of the electrical energy storage system.

9. The elevator system of claim 7, wherein the sensed parameter comprises a state of charge of the electrical energy storage system.

10. The elevator system of claim 7, wherein the sensed parameter comprises ambient temperature.

11. The elevator system of claim 1, wherein the thermoelectric thermal management system comprises:
    a thermoelectric heater/cooler;
    at least one temperature sensor for providing a temperature signal;

a state of charge monitor for providing a state of charge signal indicative of state of charge of the electrical energy storage system; and a controller for controlling operation of the thermoelectric heater/cooler as a function of both the temperature signal and the state of charge signal to selectively heat and cool the energy storage system to maintain the energy storage system in a desired operating temperature range.

12. The elevator system of claim 11, wherein the controller also controls charging of the electrical energy storage system by regenerative power as a function of the temperature signal and the state of charge.

13. The elevator system of claim 12, wherein the controller selects whether regenerative power is used to operate the thermoelectric heater/cooler.

14. A method of thermally managing an electrical energy storage system of a regenerative elevator system, the method comprising:

sensing temperature of the electrical energy storage system;

monitoring state of charge of the electrical energy storage system; and controlling operation of a thermoelectric heater/cooler as a function of both sensed temperature and state of charge to selectively heat and cool the energy storage system to maintain the electrical energy storage system in a desired operating temperature range.

15. The method of claim 14 and further comprising:

controlling charging and discharging of the electrical energy storage system as a function of sensed temperature and state of charge.

16. The method of claim 14 and further comprising:

selectively operating the thermoelectric heater/cooler using regenerative power produced by the regenerative elevator system.

17. A regenerative elevator system comprising:

a hoist motor;

an electric storage device;

a regenerative charging circuit for delivering electrical energy from the hoist motor to the electric storage device when the hoist motor is operating as a generator;

a thermoelectric heater/cooler selectively heating and cooling the electric storage device to maintain the energy storage device in a desired operating temperature range.

18. The regenerative elevator system of claim 17 and further comprising:

a controller for controlling the thermoelectric heater/cooler as a function of both temperature and state of charge of the electric storage device.

19. The regenerative elevator system of claim 18, wherein the controller selectively causes the thermoelectric heater/cooler to use electrical energy from the regenerative charging circuit.

20. The regenerative elevator system of claim 18, wherein the controller controls charging and discharging of the electric storage device as a function of temperature and state of charge of the electric storage device.

21. An elevator system comprising:

an elevator;

a drive system for driving the elevator during a motoring mode and producing electrical energy during a regenerative mode;

an electrical energy storage system for storing electrical energy produced by the drive system during the regenerative mode; and a thermoelectric thermal management system for controlling an ambient condition of the electrical energy storage system, wherein the thermoelectric thermal management system comprises:

a thermoelectric heater/cooler;

at least one temperature sensor for providing a temperature signal;

a state of charge monitor for providing a state of charge signal indicative of state of charge of the electrical energy storage system; and a controller for controlling operation of the thermoelectric heater/cooler as a function of the temperature signal and the state of charge signal, wherein the controller also controls charging of the electrical energy storage system by regenerative power as a function of the temperature signal and the state of charge signal.

22. The elevator system of claim 21, wherein the controller selects whether regenerative power is used to operate the thermoelectric heater/cooler.

23. A regenerative elevator system comprising:

a hoist motor;

an electric storage device;

a regenerative charging circuit for delivering electrical energy from the hoist motor to the electric storage device when the hoist motor is operating as a generator;

a thermoelectric heater/cooler for controlling temperature of the electric storage device; and a controller for controlling the thermoelectric heater/cooler as a function of temperature and state of charge of the electric storage device;

wherein the controller selectively causes the thermoelectric heater/cooler to use electrical energy from the regenerative charging circuit; and wherein the controller controls charging and discharging of the electric storage device as a function of temperature and state of charge of the electric storage device.

* * * * *

UNITED STATES PATENT AND TRADEMARK OFFICE
CERTIFICATE OF CORRECTION

PATENT NO. : 8,220,590 B2
APPLICATION NO. : 12/523041
DATED : July 17, 2012
INVENTOR(S) : Lei Chen and Jean Yamanis Page 1 of 1

It is certified that error appears in the above-identified patent and that said Letters Patent is hereby corrected as shown below:

Col. 6, Line 24
  Delete "passed"
  Insert --passes--

Signed and Sealed this
Ninth Day of October, 2012

David J. Kappos
*Director of the United States Patent and Trademark Office*